(12) United States Patent
Yashima

(10) Patent No.: US 9,110,616 B2
(45) Date of Patent: Aug. 18, 2015

(54) IMAGE PROCESSING APPARATUS

(71) Applicant: KYOCERA Document Solutions Inc., Osaka (JP)

(72) Inventor: Ayako Yashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/255,666

(22) Filed: Apr. 17, 2014

(65) Prior Publication Data

US 2014/0320907 A1    Oct. 30, 2014

(30) Foreign Application Priority Data

Apr. 26, 2013    (JP) .................................. 2013-093718

(51) Int. Cl.
  *G06F 3/12*  (2006.01)
  *G06K 15/00*  (2006.01)

(52) U.S. Cl.
  CPC .................................... *G06F 3/1256* (2013.01)

(58) Field of Classification Search
  CPC ........ H04N 1/52; H04N 1/6058; G06K 15/02
  See application file for complete search history.

(56) References Cited

U.S. PATENT DOCUMENTS

2005/0168764 A1 * 8/2005 Yamamura .................... 358/1.13
2011/0199629 A1 * 8/2011 Sensu et al. ................... 358/1.13
2011/0199639 A1 * 8/2011 Tani et al. ..................... 358/1.15

FOREIGN PATENT DOCUMENTS

| GB | 2360682 A | * | 9/2001 | .............. G06F 3/023 |
| JP | 2001-75950 A | | 3/2001 | |
| JP | 2011-86094 A | | 4/2011 | |

* cited by examiner

*Primary Examiner* — Fred Guillermety
*Assistant Examiner* — Henok A Shiferaw
(74) *Attorney, Agent, or Firm* — Stein IP, LLC

(57) ABSTRACT

The preview unit displays on a display a preview image of image data in the image data retaining unit. The position receiving unit receives a position that user designates on the preview image displayed on the display. The selection receiving unit receives a user selection of additional information retained in the additional information retaining unit. The information imparting unit imparts the additional information received by the selection receiving unit to the position received by the position receiving unit. The image processing unit extracts a page imparted with the additional information from the image data in the image data retaining unit, and executes the processing associated with the additional information.

5 Claims, 11 Drawing Sheets

| ADDITIONAL INFORMATION | PROCESSING |
|---|---|
| ← | PRINTING AND STORING STORED FILE NAME : xxp_A |
| ⇐ | PRINTING AND STORING STORED FILE NAME: xxp_B |
| ←-- | PRINTING AND STORING STORED FILE NAME: xxp_C |

Note: "p" is a page number.

IMAGE PROCESSING APPARATUS

CROSS-REFERENCE TO RELATED APPLICATIONS

This application claims the benefit of Japanese Application No. 2013-093718, filed Apr. 26, 2013, in the Japanese Patent Office. All disclosures of the document(s) named above are incorporated herein by reference.

BACKGROUND OF THE INVENTION

The present disclosure relates to image forming apparatus.

Recently, Multi-Function Peripherals (MFP) having multifunction of a scanner, a facsimile machine, a printer and a copying machine are used in offices. The MFP is frequently used being connected with information processing terminals like a personal computer via a network such as a LAN (Local Area Network), and works as an image forming device for printing out image data inputted from the information processing terminal on papers, an image reader for obtaining image data to be used on the information processing terminal, a facsimile machine for transmitting the image data to a designated address, and a document management device for storing document image data so as to be searchable.

Some of the above-mentioned MFPs have an editing function for image data. As such editing function, various techniques have been proposed taking account of user friendliness. For instance, it is known the image display and the editing system including the preview displaying device for resending print command data corrected based on the editing operation after the editing operation while executing the preview display, and enables to execute the editing like dividing, deleting, copying, pasting, and sorting pages.

It is also known the MFP that has a function for deleting unnecessary files automatically. Various techniques have been known as the automatic deleting function, taking account of user friendliness. For instance, one of the conventional arts is configured so as to search an incomplete file ended and stored in the middle of creation that is caused by an interruption of a storing process at storing a specific data as a file, and deleting the searched incomplete file if the searched incomplete file is to be a complete one but it is not a complete file. In addition, if the incomplete file is not necessary to be complete, the incomplete file is repaired and the name of the repaired file is changed so as to recognize that the file was repaired.

It occurs in the office that the document is frequently digitalized to image data by the Multi-function Peripheral, and the image data is sent to a third person. The transmission doesn't make any sense if the image data includes all the information. It frequently occurs that the information that is necessary for the sender and receiver in fact is a limited part of the image data.

For instance, in the material department, when an estimate is requested to plural companies regarding a purchase scheduled good for purchasing the good, the document to be sent to an authorized person having a power to decide the supplier in order to investigate the supplier (or indicate the supplier decision process) should include all the estimates from the plural companies. However, the information in fact after the supplier has been decided is only one estimate complying with desired conditions and the other estimates become unnecessary information. Therefore, the following processing is done; extracting a page including the necessary information from the document including all the information, and storing the page after the necessary information on the page is marked.

In this situation, the image data of the former document (the document including all the information) is easily prepared and stored by digitalizing the plural pages of the document by means of an image reading function of the MFP. On the other hand, in order to take out a page including the necessary information from the image data and store the page after the mark is imparted to the necessary part of the information on the page, the following steps are required; printing out the necessary page of the prepared image data; imparting the mark to the printed matter, and then storing after the printed matter is digitalized. Otherwise, the following steps are performed by the above-mentioned editing function; dividing the image data into pages; imparting the mark to the divided image data by the editing function; and storing the image data after the editing.

In case of the former method, since the printing, the image reading, and the storing processes must be executed and there are a large number of processing to be executed, it is not efficient. In case of the later method, the MFP requires the editing function. If the MFP is not provided with the editing function, it is necessary for the information processing terminal to be provided with the image editing software operable thereon. In general, when the image data is divided, each page as divided is given a file name automatically (such as a serial number) and then stored. At imparting the mark to each page, it is hard to recognize which file is the necessary page. Accordingly, though the latter method does not require the printing, there is a large amount of processing, and it is not efficient.

SUMMARY OF THE INVENTION

The image forming apparatus in the disclosure includes an image data retaining unit, a preview unit, a position receiving unit, an additional information retaining unit, a selection receiving unit, an information imparting unit, and an image processing unit. The image data retaining unit retains image data. The preview unit displays on a display screen a preview image of the image data retained in the image data retaining unit. The position receiving unit receives a position designated on the preview image displayed on the displayed screen by user. The additional information retaining unit retains additional information registered in advance. The selection receiving unit receives a user selection of the additional information retained by the additional information retaining unit. The information imparting unit imparts the additional information received by the selection receiving unit to the position received by the position receiving unit. The image processing unit extracts a page imparted with the additional information by the information imparting unit from the image data retained in the image data retaining unit, and executes the processing associated with the additional information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

One of embodiments of the present disclosure will be more specifically explained hereinafter with reference to the attached drawings. In the following explanation, the present disclosure is materialized by a digital multifunction periphery (MFP).

Figure 1:
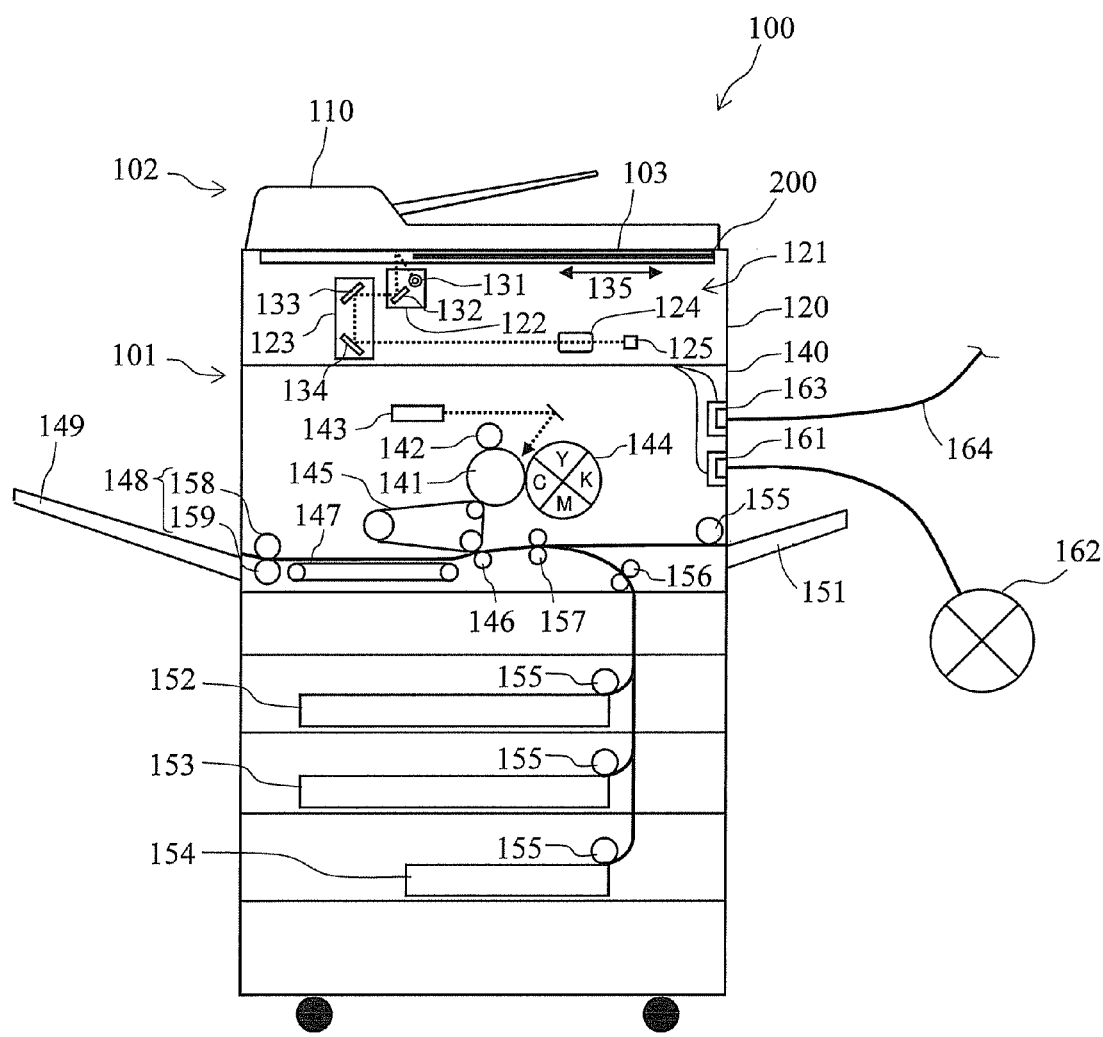
FIG. 1 is a schematic block diagram showing an entire structure of the Multi-Function Peripheral (MFP) in accordance with an embodiment of the present disclosure.

FIG. 1 is a schematic block diagram showing an entire structure of the digital MFP in the embodiment. In FIG. 1, the MFP 100 is provided with a base machine 101 having an image reading unit 120 and an image forming unit 140, and a platen cover 102 mounted on a top of the base machine 101. An original plate 103 is mounted on the top of the base machine 101, and the original plate 103 is opened and closed by the platen cover 102. The platen cover 102 is provided with a document feeder 110. The MFP 100 is provided on its front side with an operation panel 200 whereby a user can give the MFP a copy start instruction and other instructions, and confirm a status or setting of the MFP.

The image reading unit 120 is disposed below the original plate 103. The image reading unit 120 reads an image of an original by a scanning optical unit 121, and creates digital data (image data) of the image. The original can be placed on the original plate 103 or the document feeder 110. The scanning optical unit 121 is provided with a first carriage 122 and a second carriage 123, and a condenser lens 124. The first carriage 122 has a linear light source 131 and a mirror 132, and the second carriage 123 has mirrors 133 and 134. The light source 131 illuminates the original. The mirrors 132, 133 and 134 guide the reflected light from the original to the condenser lens 124, and the condenser lens 124 forms an image on a right receiving surface of a line image sensor 125. In the scanning optical unit 121, the first carriage 122 and the second carriage 123 are mounted so as to reciprocate in a sub scanning direction 135. The image sensor 125 can read the image of the original placed on the original plate 103 by moving the first carriage 122 and the second carriage 123 in the sub scanning direction 135. In case of reading the image of the original set on the document feeder 110, the image reading unit 120 temporarily fixes the first carriage 122 and the second carriage 123 on an image reading position, and then reads the image of the original passing the image reading position by means of the image sensor 125. For instance, the image sensor 125 creates the image data of the original corresponding to each color component of R (red), G (green), and B (blue) from the light image incident to the light receiving surface.

The created image data can be printed out on papers by the image forming unit 140. The image data also can be sent to other devices (not show in Figures) from a network interface 161 via network 162. Moreover, the image data can be transmitted by facsimile from a FAX interface 163 via a public communication line 164.

The image data obtained by the image reading unit 120, the image data received from other devices connected with the network 162, and the image data received via the public communication line 164 can be printed out on papers by means of the image forming unit 140.

The image forming unit 140 is provided with a photoconductor drum 141. The photoconductor drum 141 rotates at a specific speed in one direction. A charging unit 142, an exposing unit 143, a developing unit 144, and an intermediate transfer belt 145 are arranged around the photoconductor drum 141 successively from an upstream side of the rotating direction of the photoconductor drum 141. The charging unit 142 uniformly electrifies a surface of the photoconductor drum 141. The exposing unit 143 radiates light on the surface of the photoconductor drum 141 according to the image data, and forms a latent image on the photoconductor drum 141. The developing unit 144 sticks toners to the latent image and forms a toner image on the photoconductor drum 141. The intermediate transfer belt 145 transfers the toner image formed on the photoconductor drum 141 to the paper. When the image data is a color image, the intermediate transfer belt 145 transfers each color of the toner image to a same paper. The RGB form of color image is converted to the image data in a form of C (cyan), M (magenta), Y (yellow), and K (black), and each color component of the image data is inputted to the exposing unit 143.

The image forming unit 140 supplies the papers to a transfer unit between the intermediate transfer belt 145 and a transfer roller 146 from a manual paper feed tray 151 or paper feed cassettes 152, 153, and 154. It is possible to put or accommodate various types of papers in the manual paper feed tray 151 or the paper feed cassettes 152, 153, and 154. The image forming unit 140 selects the paper specified by the user or the paper corresponding to a size of original detected automatically, and the selected paper is supplied from the manual paper feed tray 151 or the paper feed cassettes 152, 153, and 154 through a feed roller 155. The supplied paper is conveyed to the transfer unit by a conveyance roller 156 and a resist roller 157. The paper on which the toner image is transferred is conveyed to a fixing unit 148 by a conveyance belt 147. The fixing unit 148 has a fixing roller 158 including a built-in heater and a pressure roller 159, and the toner image is fixed on the paper by the heat and the pressure. The image forming unit 140 ejects the paper passed through the fixing unit 148 to a copy receiving tray 149.

Figure 2:
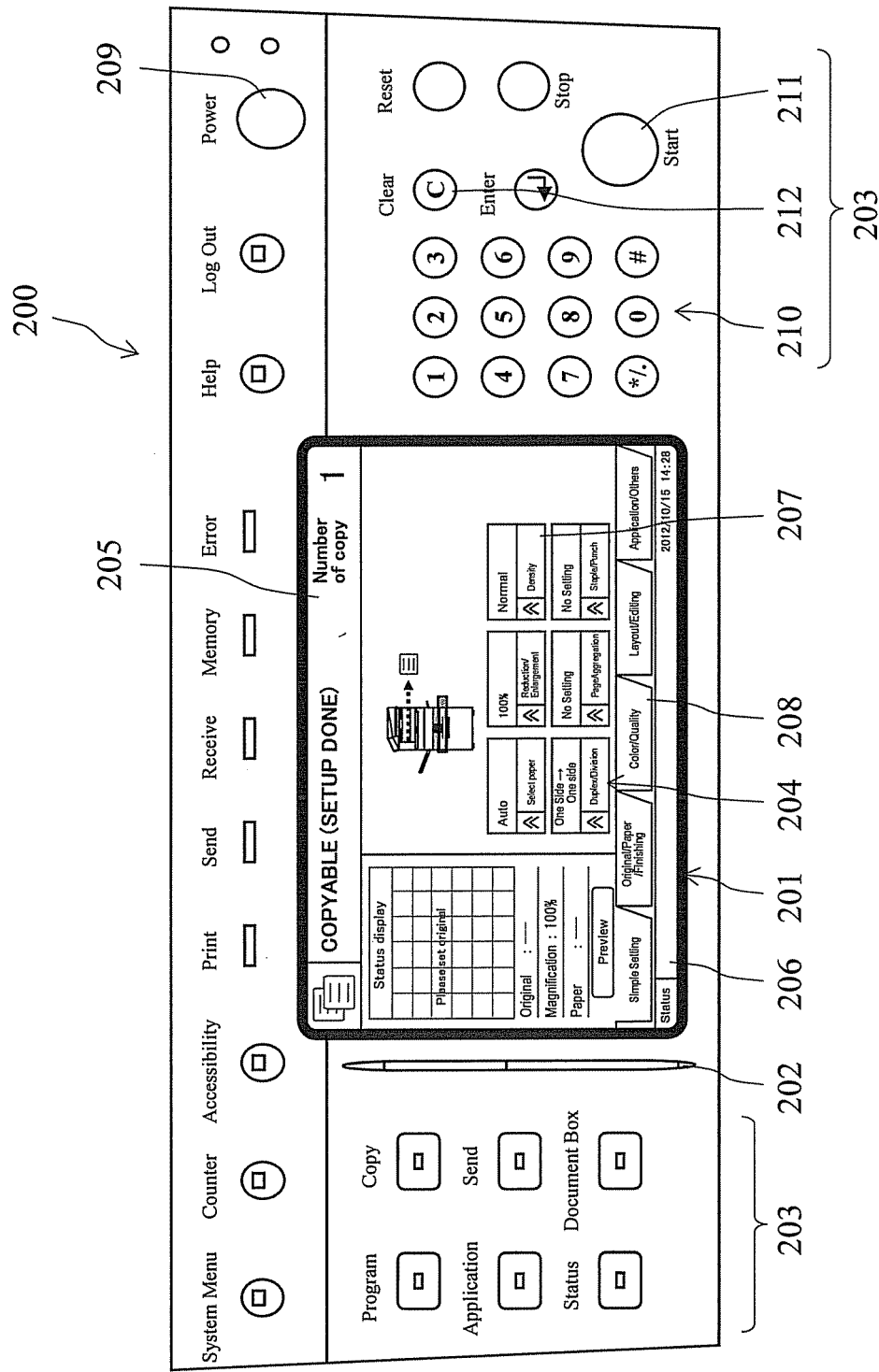
FIG. 2 is a schematic diagram showing an operation panel of the MFP in accordance with an embodiment of the present disclosure.

FIG. 2 is a view showing an appearance of the operation panel provided to the MFP. The user can give an instruction of the copy start or the other instructions, or confirm the status and setting of the MFP 100, by means of an operation panel 200. A display with a touch panel 201 and operation keys 203 are arranged on the operation panel 200. The display 201 is provided with a screen of a liquid display for displaying operation buttons and messages and a sensor for detecting a portion pressed on the screen. A method of detecting the pressed position is not limited in particular, and it may employ any method of the Resistive Film method, the Electrostatic Capacity method, the Surface Acoustic Wave method, or the Electromagnetic Wave method. The user can do input though the display 201 using his finger or a touch pen 202.

The display 201 displays an operation screen having a button displaying section 204, a message displaying section 205, and a status displaying section 206. The button displaying section 204 has a plurality of tabs 208, and each tab includes operation buttons corresponding to processing categorized as each tab. A "simple setting" tab has the operation buttons to be used for a basic setting. As shown in FIG. 2, the operation buttons are for setting a paper size, a copy magnification ratio, the density, a printed side of paper, a page aggregation, and a post processing. For instance, when the user presses the "density" button 207, a pop-up screen including buttons for selecting the printing density, such as "light", "normal" and "dark", is displayed superimposing on the operation button. The density is determined by the selection (press down) of the user. The button displaying section in FIG. 2 also includes the other tabs except for the "simple setting" tab, such as an "original/paper/finishing" tab, a "color/quality" tab, a "layout/editing" tab, and an "application/others" tab. The tab to be displayed can be changed by the user's operation for selecting one from the tab buttons 208. During the tab is being selected, the other tabs and other elements are hidden on the operation screen.

The message displaying section 205 displays a message notifying the user of the setting such as the copying can be performed or not, a number of copy, and so on. The status displaying section 206 displays information about a status of the apparatus if necessary. The display of the status displaying section 206 reflects results detected by respective sensors provided to the MFP 100. The apparatus status information is a message for warning the user to deal with the abnormality even though the apparatus is operable. The information, for example, includes that the residual amount of papers is little, the original plate 103 is dirty, the facsimile document is stored in a memory when the received facsimile document is set to be stored in the memory. The apparatus status information also may include the out of paper, the conveyance jamming and so on.

The operation keys 203 includes a main power supply key 209, numeric keys 210, a start key 211, and a clear key 212. The main power supply key 209 is used for switching ON and OFF of the MFP 100. The numeric keys 210 are used for setting the number of copy and the copy magnification ration. After the user has completed the setup, the MFP 100 displays "copyable (setup done)" on the message displaying section 205, and notifies the user that the setup is done by the user. The start key 211 is used for instructing the start of copying and image printing. When the user wishes to cancel the setting done by himself, the user operates the clear key 212. Since the user can know whether the machine has accepted the user setting according to the above-mentioned message, the user may operate only the clear key 212 if the user setting is unnecessary.

Figure 3:
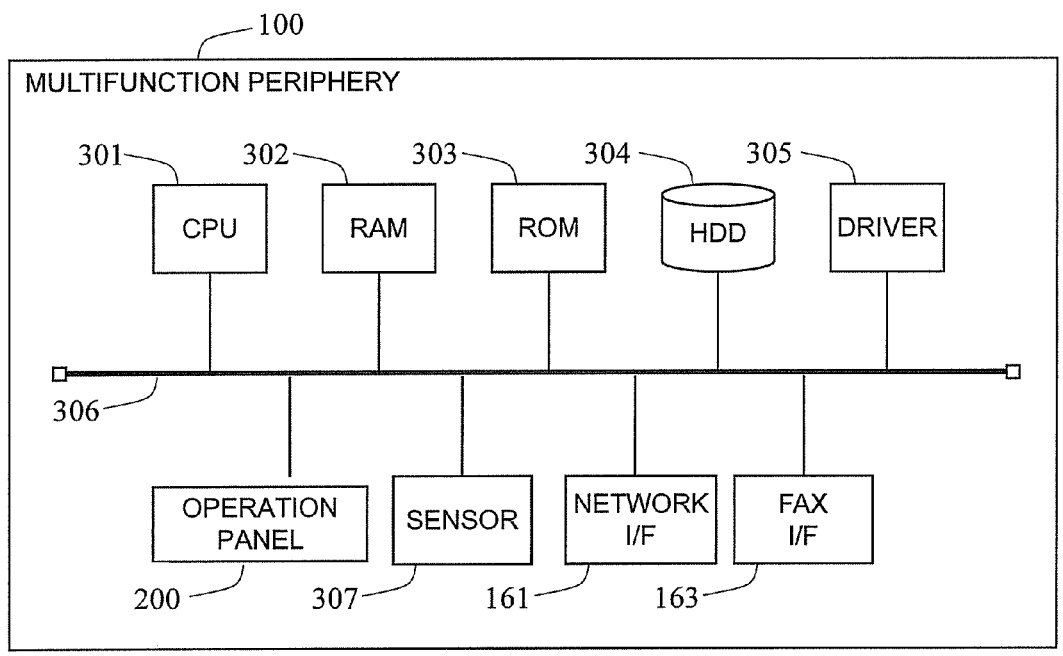
FIG. 3 is a diagram showing a hardware structure of the MFP in accordance with an embodiment of the present disclosure.

FIG. 3 is a hardware block diagram of control units for the MFP. The MFP 100 in this embodiment is connected with CPU (Central Processing Unit) 301, RAM (Random Access Memory) 302, ROM (Read Only Memory) 303, HDD (Hard Disk Drive) 304, and driver 305 corresponding to each driving unit for the document feeder 110, the image reading unit 120, and the image forming unit 140, through an internal path 306. ROM 303 and HDD 304 stores control programs, and CPU 301 controls the MFP 100 according to the instructions from the control programs. For instance, CPU 301 uses RAM 302 as a working area, and sends and receives the instruction and the data via driver 305, whereby the operation of each driving unit can be controlled. HDD 304 is used for storing the image data obtained from the image reading unit 120, the image data received from the other devise via network interface 161, and the image data received via the FAX interface 163.

The internal path 306 is also connected with the operation panel 200 and a sensor 307. The operation panel 200 receives the user operation, and supplies a signal based on the operation to the CPU 301. The display 201 of the operation panel 200 displays the operation screen according to the control signal from the CPU 301. The sensor 307 includes various sensors, such as an open and shut detecting unit for detecting opening and shutting of the platen cover 102, an original detecting unit for detecting an original on the original plate 103, a temperature detecting unit for detecting the temperature of the fixing unit 148, a detecting sensor for detecting the original or the paper to be conveyed, and so on. CPU 301 can realize under-mentioned respective means (functional blocks) by executing the programs stored in ROM 303, and as well as the working of each means is controlled corresponding to the signals from the sensors.

Figure 4:
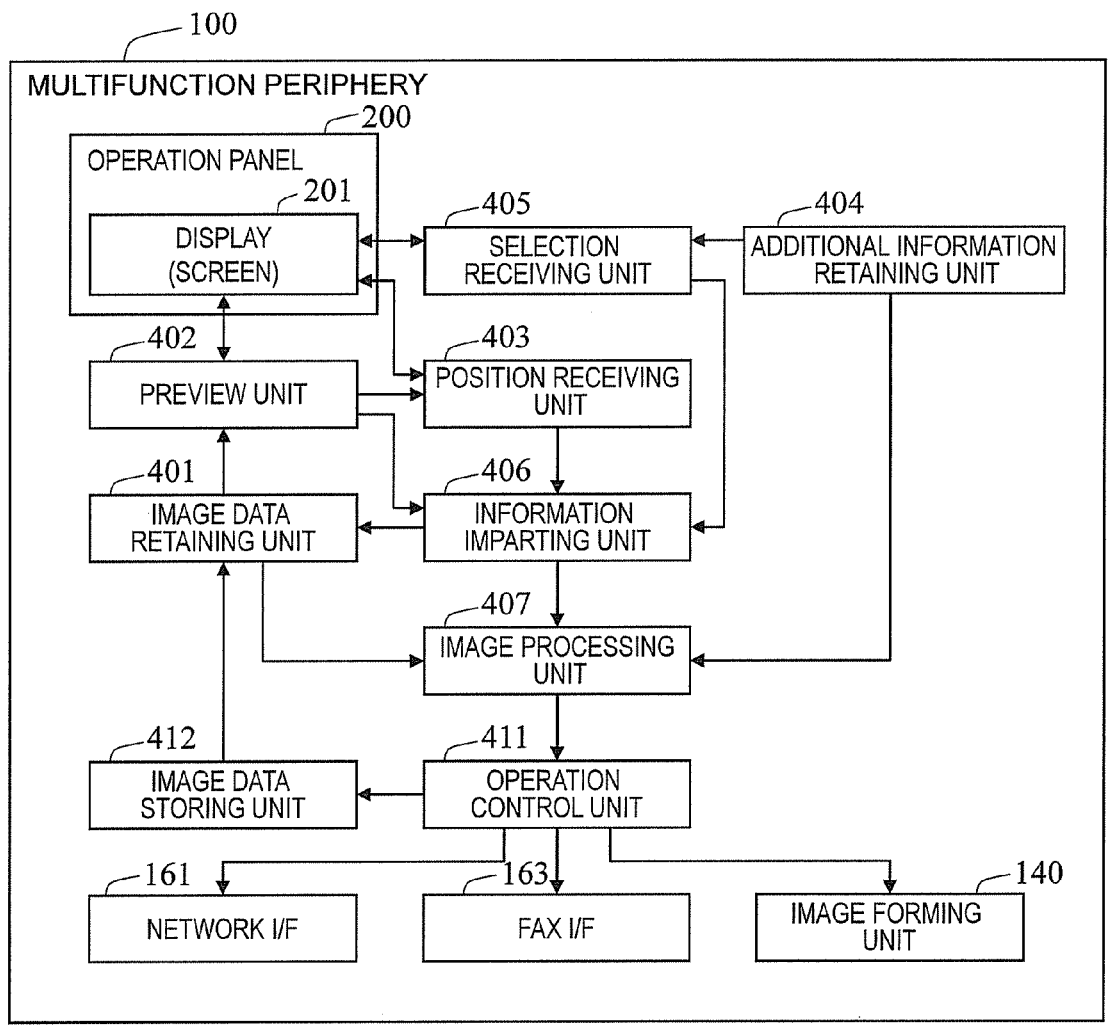
FIG. 4 is a functional block diagram showing the MFP in accordance with an embodiment of the present disclosure.

FIG. 4 is a functional block diagram of the MFP in the embodiment of the present disclosure. As shown in FIG. 4, the MFP 100 in this embodiment is provided with an image data retaining unit 401, a preview unit 402, a position receiving unit 403, an additional information retaining unit 404, a selection receiving unit 405, an information imparting unit 406, and an image processing unit 407.

The image data retaining unit 401 retains the image data to be processed. The image data to be processed can be specified from the image data stored in the MFP 100, or obtained from the image reading unit 120 or from the other devices via the network interface 161. The image data retained in the image data retaining unit 401 may be any of one page or plural pages. In the embodiment, RAM 302 works as the image data retaining unit 401.

The preview unit 402 displays a preview image of the image data retained by the image data retaining unit 401 on the display 201. The preview image corresponds to the image data retained by the image data retaining unit 401. For instance, the preview unit 402 creates the image data of which pixels are reduced so as to match a size of the display, and displays the created image data as the preview image on the display 201.

The position receiving unit 403 receives a position on the preview image displayed on the display 201 that is designated by the user. For instance, in a state that the preview image is displayed on the display 201, the position receiving unit 403 displays on the display 201 a message asking the user to designate the position (a point or a section) to impart undermentioned additional information thereto. At this time, the user designates the position on which the user wishes to impart the additional information thereto by means of his finger or the touch pen 202.

The additional information retaining unit 404 retains the additional information registered in advance. The additional information represents a specific processing (and information associated with the processing, and can be shown by an arbitrary symbol (mark) like an arrow, an underline, characters, and a sign. It is not limited in particular, but in the embodiment, the additional information retaining unit 404 retains the additional information as an additional information table. As described later, the additional information table stores the additional information (symbol) being associated with the specific processing. The processing associated with the additional information is at least one of the printing, the data storing, the data transmission to the other device, and the imparting of the access right.

The selection receiving unit 405 receives the selection of the additional information that the user has selected from the additional information retained in the additional information retaining unit 404. For instance, the selection receiving unit 405 displays on the display 201 a list of the addition information retained in the additional information retaining unit 404, and asks the user to select the additional information to be imparted. At this time, the user selects the additional information to be imparted on the display 201 by means of his finger or the touch pen 202.

The information imparting unit 406 imparts the additional information received by the selection receiving unit 405 to the position received by the position receiving unit 403.

The image processing unit 407 extracts a page imparted with the additional information by the information imparting unit 406 from the image data retained in the image data retaining unit 401, and executes the processing associated with the additional information.

In the embodiment, the MFP 100 is further provided with an operation control unit 411 and an image data storing unit 412. The operation control unit 411 controls the execution of each processing (the image reading, the facsimile transmission and receiving, and the image forming) in the MFP 100. The operation control unit 411 controls the image reading unit 120 to create the image data and execute the facsimile transmission via the FAX interface 163, and controls the image forming unit 140 to print the image data, based on the user instruction from the operation panel 200, various instruction inputted through the network interface 161, and the instruction to receive the facsimile inputted via the FAX interface 163.

The image data storing unit 412 is an inherent storage area for image data in the MFP 100. HDD 304 works as the image data storing unit 412 in the embodiment.

Figure 5:
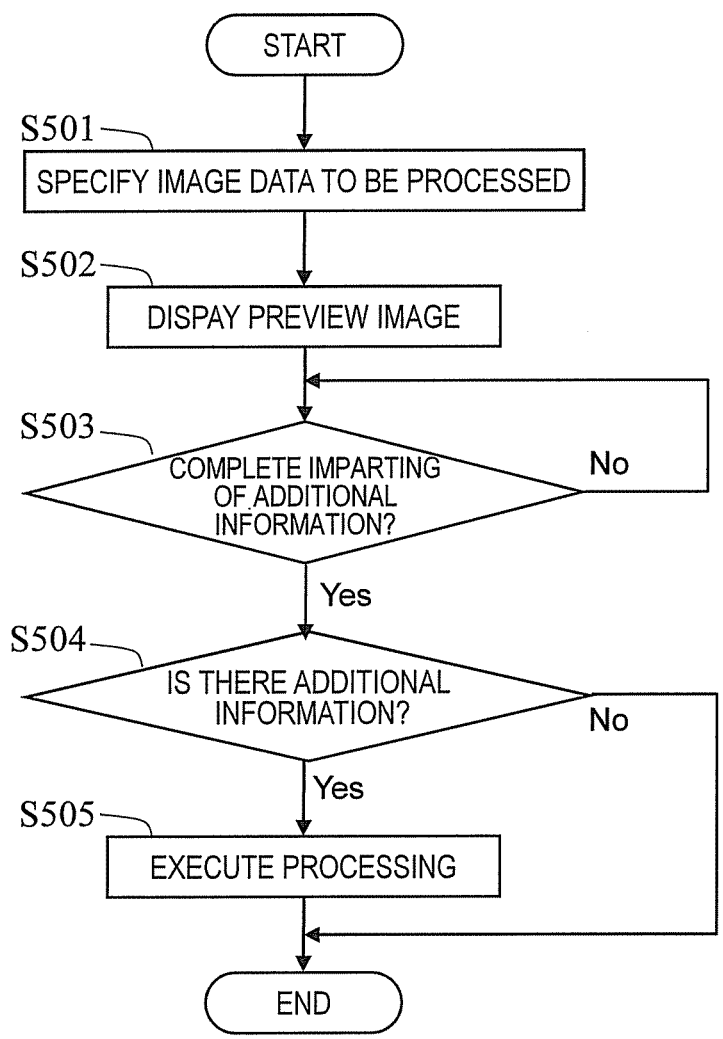
FIG. 5 is a flowchart showing an example of the additional information imparting procedure executed by the MFP in accordance with an embodiment of the present disclosure.

FIG. 5 is a flowchart showing a procedure of imparting the additional information executed by the MFP 100. The start of the procedure is triggered off by the activation of the additional information imparting function made by the user through the operation panel 200. The additional information imparting function can be activated when the user presses the "additional information imparting" button included in the "layout/editing" tab of the operation screen shown in FIG. 2.

When the procedure stars, the MFP 100 (the preview unit 402, for example) asks the user to specify the image data to be processed, and waits for the specifying of the image data by the user (Step S501). The method of specifying the image data is not limited in particular. For instance, when the image data stored in the image data storing unit 412 is specified as the data to be processed, the display 201 displays a list of image data stored in the image data storing unit 412, and the user may specify one of the image data to be read from the list. The specified image data is read out from the image data storing unit 412, and retained in the image data retaining unit 401. The image data to be processed can be read by the image reading unit 120. In this case, the user sets the original to be processed on the original tray of the document feeder 110, and instructs the MFP 100 to start the reading by pressing the start key. The image data read by the image reading unit 120 is retained by the image data retaining unit 401. The image data inputted from the outside device like the information processing terminal through the network interface 161 may be retained by the image data retaining unit 401. The image data retained by the image data retaining unit 401 may be one page, but here is discussed about the case where the image data has plural pages.

Figure 6:
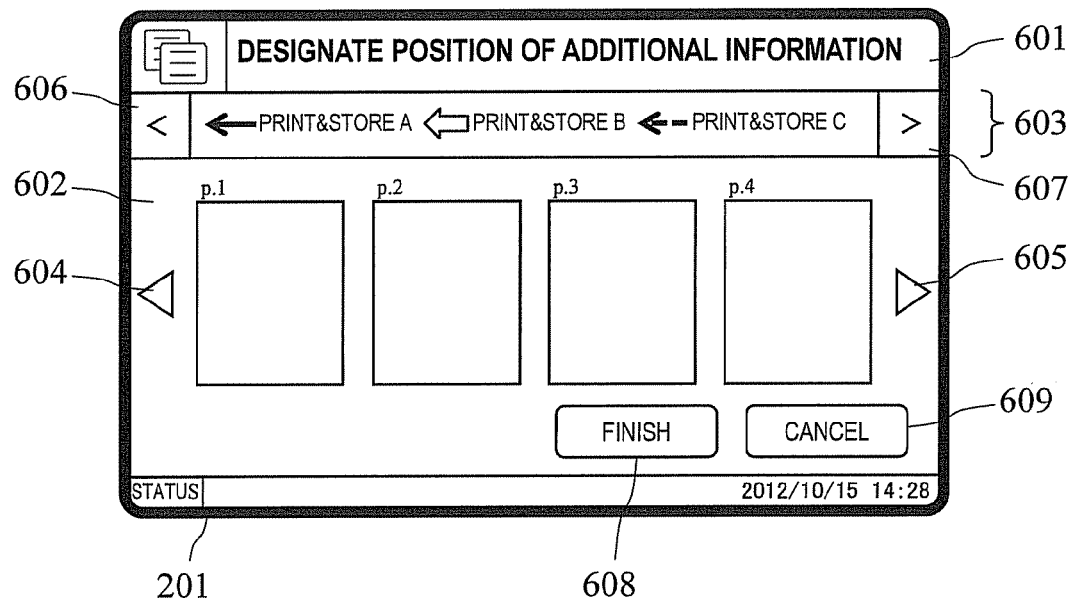
FIG. 6 shows an example of a preview screen displayed by the MFP in accordance with an embodiment of the present disclosure.

After the specifying of the image data is completed, the preview unit 402 prepares the preview image of the image data to be processed and displays the preview image on the display 201 (Step S502). FIG. 6 is a diagram showing an example of a preview screen displayed on the display 201 at this time. In this case, a preview screen 601 is provided with an image displaying section 602 for displaying the preview image of the image data to be processed, an additional information listing section 603 for displaying a list of additional information stored in the additional information retaining unit 404, a "FINISH" button 608 and a "CANCEL" button 609. The "FINISH" button 608 is used to decide to impart the additional information imparted by the under-mentioned steps. The "CANCEL" button 609 is used for interrupting the operation and returning to the step of specifying the image data (step S501). In FIG. 6, the preview images for four pages are displayed on the image displaying section 602. The preview image includes various kinds of information like characters and images, but FIG. 6 shows only frames of pages as a matter of convenience.

On the image displaying section 602, a page back button 604 and a page forward button 605 are disposed. Where the preview images exists over four pages, the preview images of the other pages can be displayed on the image displaying section 602 by operating the page back button 604 and the page forward button 605. The image displaying section 602 has an enlargement display function. At double-clicking a specific page, only the specific page is enlarged and displayed on the image displaying section 602. At this time, the image displaying section 602 displays a slide bar as necessary. Accordingly, the preview image larger than the size of the image displaying section 602 can be displayed on the image displaying section 602.

Likewise, the additional information listing section 603 is provided with a page back button 606 and a page forward button 607, and another list of additional information can be displayed on the additional information listing section 603 by operating the page back button 606 and the page forward button 607. In FIG. 6, the list of the additional information classified to a category of "PRINT & STORE" is displayed on the additional information listing section 603.

Figure 7:
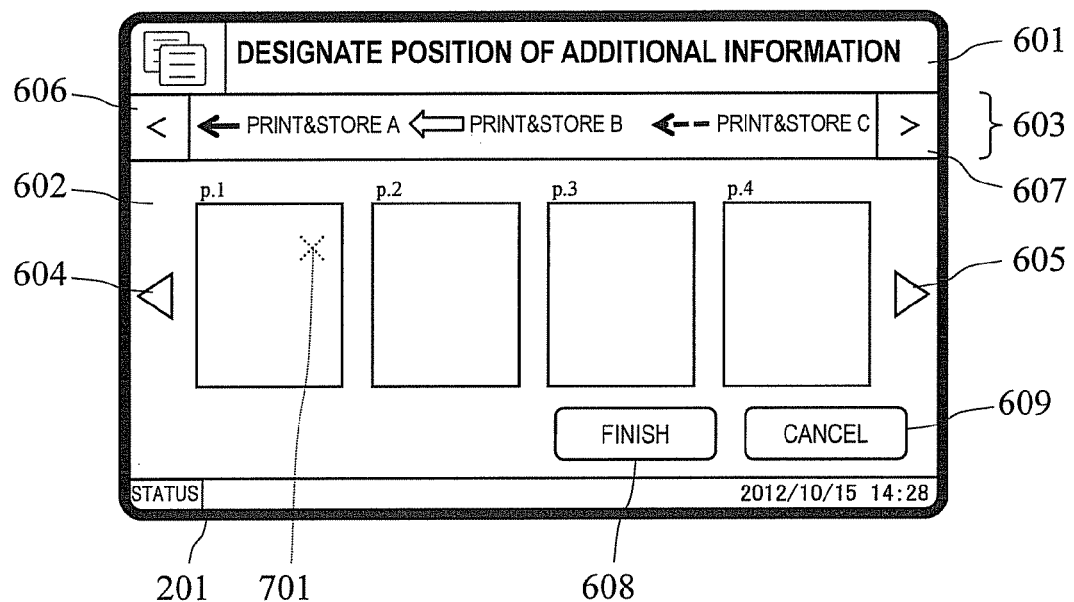
FIG. 7 shows an example of preview screen displayed by the MFP in accordance with an embodiment of the present disclosure.

When the preview screen 601 is displayed, a message is displayed by the position receiving unit 403 for asking the user to designate the position to impart with the additional information, "Designate position of additional information", on the display 201. In response to the request, the user designates the position on the preview image, the position to which the user wishes to impart with the additional information, by means of his finger or the touch pen. FIG. 7 is a diagram showing an example of the position designation made by the user. In FIG. 7, the user designates an upper right position 701 on a first page by tapping.

Figure 8:
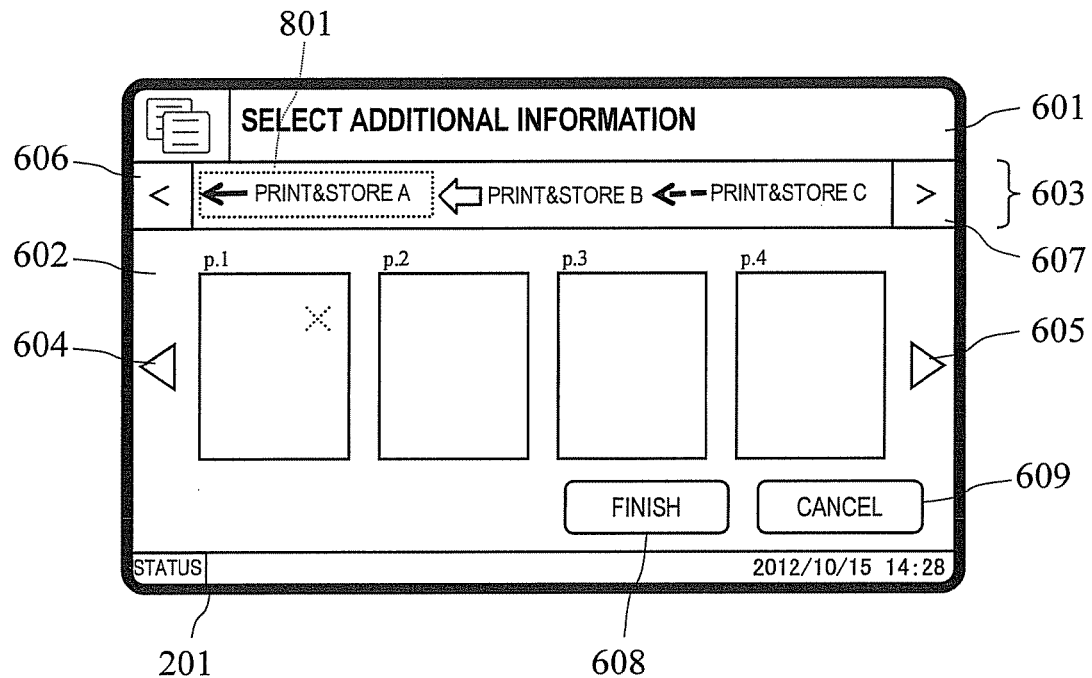
FIG. 8 shows an example of preview screen displayed by the MFP in accordance with an embodiment of the present disclosure.

When the user has designated the desired position to impart with the additional information, a message is displayed by the selection receiving unit 405 for asking the user to select the desired additional information, "Select additional information", on the display 201, as shown in FIG. 8. In response to the request, the user selects the desired one from the list of the additional information displayed on the additional information listing section 603 by means of his finger or the touch pen 202. In FIG. 8, the user selects the additional information represented by a solid line arrow 801 corresponding to "PRINT & STORE A" by tapping.

Figure 9:
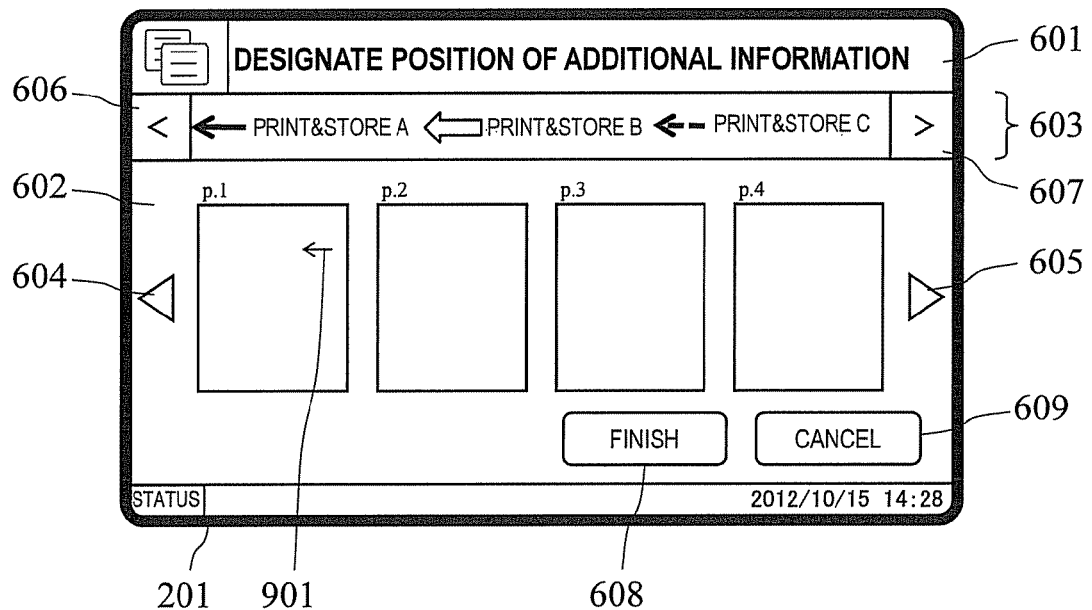
FIG. 9 shows an example of preview screen displayed by the MFP in accordance with an embodiment of the present disclosure.

According to the above-mentioned operation by the user, the position receiving unit 403 recognizes the position to impart and the selection receiving unit 405 recognizes the selected additional information. The position receiving unit 403 and the selection receiving unit 405 input the recognized information to the information imparting unit 406. The information imparting unit 406 imparts the addition information received by the selection receiving unit 405 to the position received by the position receiving unit 403 on the image data retained by the image data retaining unit 401. At this time, the preview screen 601 displays the symbol (the solid line arrow) 901 on the designated position of the specified page as shown in FIG. 9, the symbol 901 indicating that the selected additional information is imparted to the designated position.

Figures 10, 11:
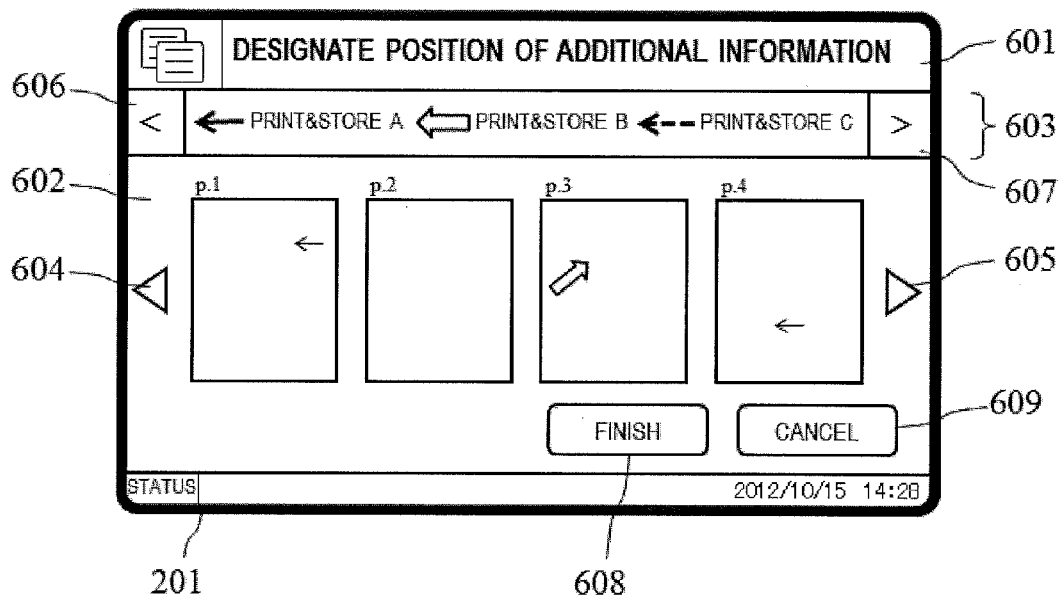
FIG. 10 shows an example of preview screen displayed by the MFP in accordance with an embodiment of the present disclosure.
FIG. 11 shows an example of the additional information table retained in additional information retaining unit in the MFP in accordance with an embodiment of the present disclosure.

If the user wishes to impart the additional information to the other positions, he repeats the above-mentioned steps. In FIG. 10, the additional information symbol of a void arrow corresponding to "PRINT & STORE B" is imparted to Page 3 and the additional information symbol of the solid line arrow corresponding to "PRINT & STORE A" is imparted to Page 4, in addition to the state shown in FIG. 9. Besides, in this embodiment, when the additional information is selected, a direction of the symbol (additional information) is changeable freely on the display section 602 for a specific time. The method of rotating the direction of the symbol can be realized by a well-known interface, which is not explained here. The "direction" data is received by the position receiving unit 403 as the rotation angle data.

FIG. 11 is a diagram showing an example of the additional information table retained in the additional information retaining unit 404. FIG. 11 shows the additional information table corresponding to the category of "PRINT & STORE". As shown in FIG. 11, the additional information table 1101 stores the additional information (symbol) being associated with a specific processing. It is not limited in particular, but in FIG. 11, the additional information table 1101 stores the additional information "solid line arrow" being associated with the processing "PRINT & STORE" and "STORED FILE NAME: xxp_A" (an extension is omitted). That is to say, when the additional information "solid line arrow" is imparted to a specific page, the page is stored as a file name "xxp_A" as well as the page is printed out. The "xx" is a character string like a file name of the original image data or a name specified by the user, and "p" is a page number. The "_A" is information that the page is stored corresponding to the additional information "PRINT & STORE A", whereby the user can easily recognize the contents according to the file name. For example, as shown in FIG. 10, Page 1 is stored as the file name "xx1_A" as well as being printed out, and Page 4 is stored as the file name "xx4_A" as well as being printed out.

Likewise, in FIG. 11, the additional information "void arrow" is stored being associated with "PRINT & STORE" and "STORED FILE NAME: xxp_B", while the additional information "broken line arrow" is stored being associated with "PRINT & STORE" and "STORED FILE NAME: xxp_C".

The user that has completed the imparting of the additional information presses the "FINISH" button 608, and thereby the completion of the imparting is inputted (Step S503, YES). Upon receipt of the input of an instruction that the imparting has completed, the preview unit 402 notifies the information imparting unit 406 of the instruction. In this embodiment, the information imparting unit 406 receiving the notice combines the imparted additional information (symbols) and the image data retained by the image data retaining unit 401.

The information imparting unit 406, that has combined the additional information (symbols) and the image data, notifies the image processing unit 407 whether there is the additional information or not (whether or not the additional information is imparted by the user). The image processing unit 407 receiving the notice, if the additional information is not imparted, executes nothing and ends the procedure (Step S504, NO). If the additional information is imparted, the image processing unit 407 refers to the additional information retaining unit 404 and executes the processing associated with the additional information via the operation control unit 411, as well as extracts the page imparted with the additional information by the information imparting unit 406 from the image data retained by the image data retaining unit 401 (Step 504 Yes, S505).

In the example shown in FIG. 10, Page 1, Page 3 and Page 4 are printed out respectively by the image forming unit 140 in the state that the imparted additional information (symbols) is combined to each page, and each page is stored as the file name "xx1_A", "xx3_B" and "xx4_A" in the image data storing unit 412.

As described above, in the MFP 100, an simple operation for imparting the additional information is executed by the user on the preview image, whereby it is possible to perform a desired processing on a specific page of the image data.

Figure 12:
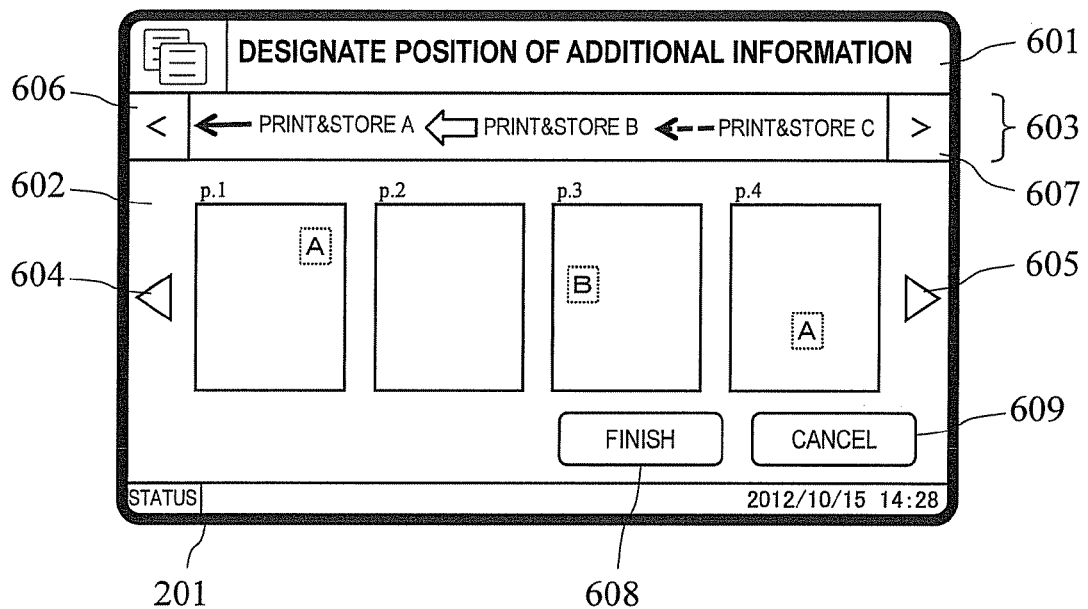
FIG. 12 shows another example of preview screen displayed by the MFP in accordance with an embodiment of the present disclosure.

In the above-mentioned steps, both the printing and the storing are executed concurrently, but the printing may be executed alone. In the above-mentioned steps, both the printing and the storing are executed in the condition that the symbol is combined with the image data, however, one of the printing and the storing may be executed in the condition that the symbol is combined with the image data, while the other of the printing and the storing may be executed in the condition that the symbol is not combined with the image data. Otherwise, both processing may be executed in the condition that the symbol is not combined with image data (that is, the symbol is used as a mark for user's operation). In the above description, it is configured that the additional information (symbol) itself is displayed on the preview page in the image display section 602, however, it may be configured as shown in FIG. 12 that only the information corresponding to the symbol (the information indicating the symbol, in FIG. 12) is displayed at a specified portion.

The other examples to which the present disclosure can be applied are discussed briefly hereinafter.

Figure 13:
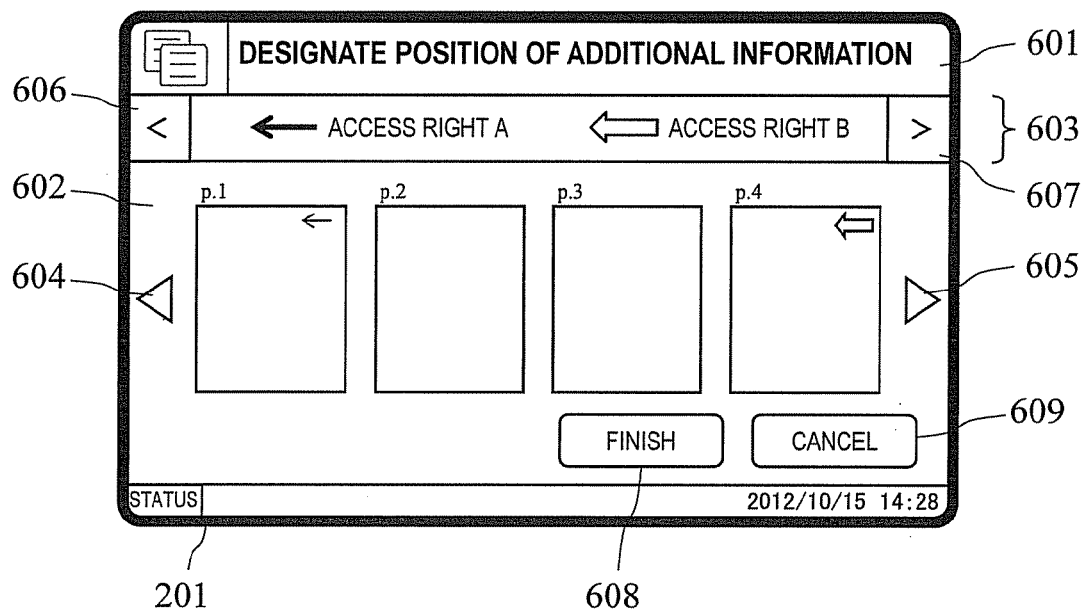
FIG. 13 shows an example of an execution of imparting an access right on the preview screen displayed by the MFP in accordance with an embodiment of the present disclosure.

FIG. 13 shows an example that the processing associated with the additional information is the imparting of access right. In FIG. 13, the additional information listing section 603 of the preview screen 601 displays a list of additional information classified to the category of "setting and storing of access right" by the user operation of the page back button 606 or the page forward button 607. The additional information "solid line arrow" is associated with "ACCESS RIGHT A" that means no access right (all users are able to access), and the additional information "void arrow" is associated with "ACCESS RIGHT B" that means the access right for the user only (only the operator can access).

In addition, FIG. 13 shows that the additional information "solid line arrow" and the additional information "void arrow" are imparted respectively to Page 1 and Page 4 by the user operation. When the user presses the "FINISH" button 608 in this state, the image processing unit 407 extracts Page 1 and stores the page in the state of setting the "ACCESS RIGHT A", at the same time, extracts Page 4 and stores the page in the state of setting the "ACCESS RIGHT B". Besides, the file names may be imparted according to the above-mentioned method. When the MFP 100 has the web server function, the image data (file) to which the access right has been set in the above-mentioned manner may be open to public on the Web according to the setting of the access right, and be available to the other device like the information processing terminal via Web browser. Even if the MFP 100 is configured to store the created image data (file) in the other device having the Web server function, the present disclosure can provide with the same effect as the above. In case of such configuration, it is possible to eliminate the operation for setting the access right to each file after the file was created. In this case, it is possible to determine freely whether or not to combine the symbol with the image data to be imparted with the access right.

Figure 14:
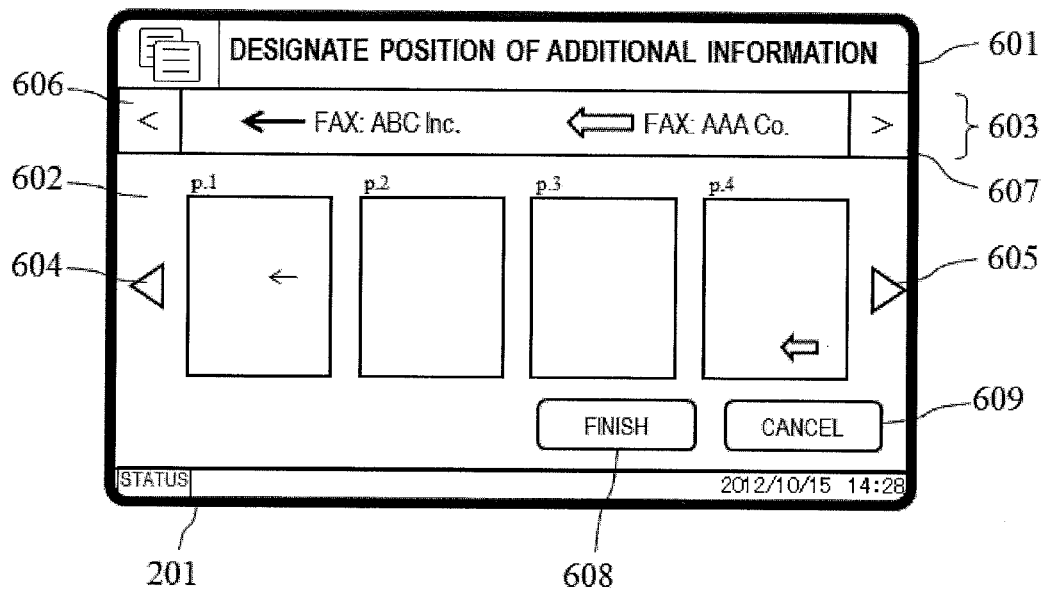
FIG. 14 shows an example of an execution of the facsimile transmission on a preview screen displayed by the MFP in accordance with an embodiment of the present disclosure.

FIG. 14 shows an example that the processing associated with the additional information is the facsimile transmission. In FIG. 14, the additional information listing section 603 of the preview screen 601 displays a list of additional information classified to the category of "facsimile transmission" by the user operation. The additional information "solid line arrow" is associated with facsimile transmission to a destination:"ABC Inc." and the additional information "void arrow" is associated with facsimile transmission to the destination: "AAA Co.". It is needless to say that each of the additional information is associated with the facsimile number of the destination.

In addition, FIG. 14 shows that Page 1 is imparted with the additional information "solid line arrow" and Page 4 is imparted with the additional information "void arrow" respectively by the user operation. When the user presses the "FINISH" button 608 in this state, the image processing unit 407 extracts Page 1 and transmits the page to the destination "ABC Inc." by facsimile, at the same time, extracts Page 4 and transmits the page to the destination "AAA Co." by facsimile. In this case, it is possible to determine freely whether or not to combine the symbol with the image data to be transmitted by facsimile.

Figure 15:
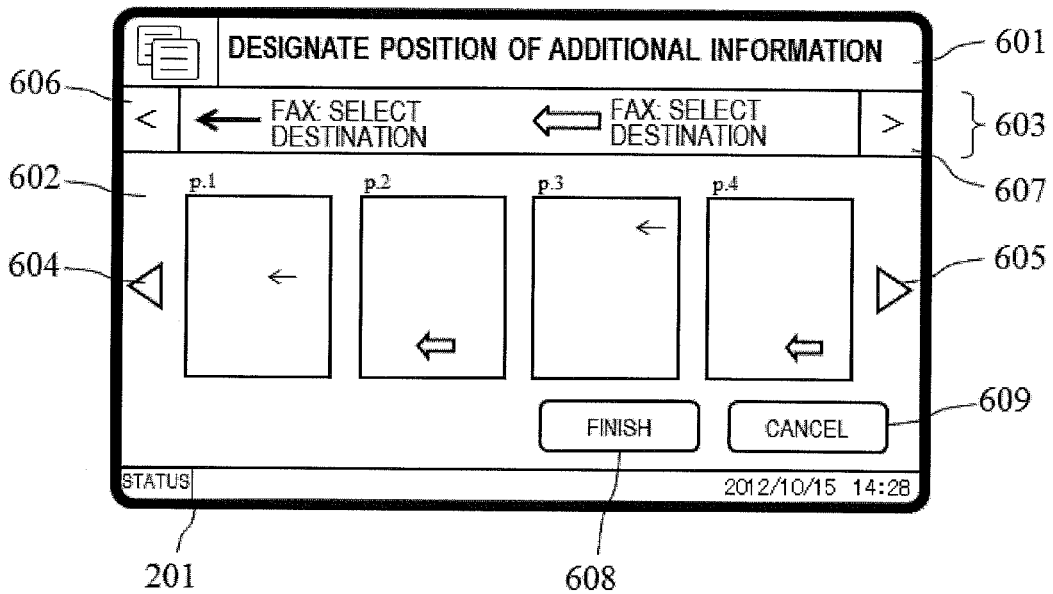
FIG. 15 shows another example of an execution of the facsimile transmission on a preview screen displayed by the MFP in accordance with an embodiment of the present disclosure.

FIG. 15 shows another example that the processing associated with the additional information is the facsimile transmission. In FIG. 15, the additional information listing section 603 of the preview screen 601 displays the list of additional information classified to the category of "facsimile transmission" by the user operation. In this case, the additional information "solid line arrow" and the additional information "void arrow" are not associated with specific destinations, but the facsimile number is requested when the image processing unit 407 executes the processing.

In addition, FIG. 15 shows that the additional information "solid line arrow" is imparted respectively to Page 1 and Page 3 and the additional information "void arrow" is imparted respectively to Page 2 and Page 4 by the user operation. When the user presses the "FINISH" button 608 in this state, the image processing unit 407 extracts Page 1 and Page 3 and requests the user to input the facsimile number of the destination. When the user specifies the facsimile number according to an address book provided to the MFP 100 or the direct input by the user, the image processing unit 407 transmits the extracted Page 1 and Page 3 to the specified destination by facsimile. Likewise, the image processing unit 407 extracts Page 2 and Page 4 and requests the user to input the facsimile number of the destination. When the user specifies the facsimile number according to the address book provided to the MFP 100 or the direct input by the user, the image processing unit 407 transmits the extracted Page 2 and Page 4 to the specified destination by facsimile.

In the above configuration, there is no need to process the image data consisting of plural pages, and a desired page can be transmitted to a desired destination by facsimile. Even if the original is a paper medium, it is possible to eliminate the operation for picking up a page necessary for each destination. In this case, it is possible to determine freely whether or not to combine the symbol with the image data to be transmitted by facsimile.

Figure 16:
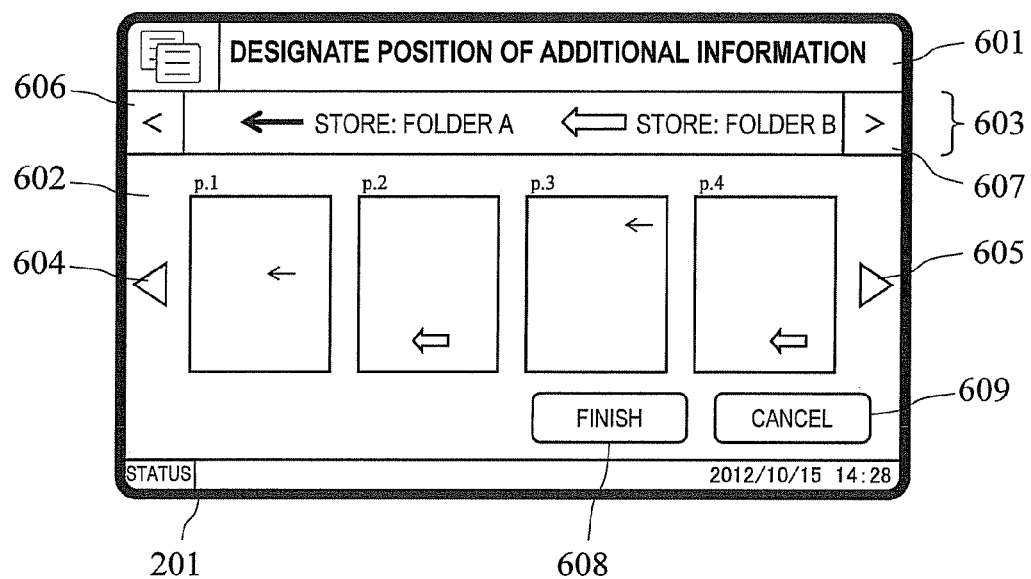
FIG. 16 shows an example of an execution of the file storing on a preview screen displayed by the MFP in accordance with an embodiment of the present disclosure.

In FIG. 16 shows an example that the processing associated with the additional information is the file storing. In FIG. 16, the additional information listing section 603 of the preview screen 601 displays the list of additional information classified to the category of the "storing" by the user operation. The additional information "solid line arrow" is associated with "STORE: FOLDER A" for storing the image data in the folder A, and the additional information "void arrow" is associated with "STORE: FOLDER B" for storing the image data in the folder B.

In addition, FIG. 16 shows that the additional information "solid line arrow" is imparted respectively to Page 1 and Page 3 and the additional information "void arrow" is imparted respectively to Page 2 and Page 4 by the user operation. When the user presses the "FINISH" button 608 in this state, the image processing unit 407 extracts Page 1 and Page 3 and stores them in the folder A of the image data storing unit 412, at the same time, extracts Page 2 and Page 4 and stores them in the folder B of the image data storing unit 412. Besides the file name may be imparted according to the above-mentioned method.

As described above, in the MFP 100, only by the operation of imparting the user-selected additional information to the user-designated position on the preview image, the processing associated with the additional information is executed on the additional information imparted page of the image data. Therefore, the user can execute the desired processing on the image data by the very simple manner.

Besides, the embodiments described above do not limit the technical scope of the present disclosure, and the disclosure can be modified and applied in various manners within the scope of the present disclosure except for the above mentioned embodiment. For instance, the above embodiments are explained according to the operations through the operation panel of the MFP that is the image processing device, but the operations may be performed through the information processing terminal, like a personal computer, connected with the MFP for the communication. In such case, the function of the display 201 of the operation panel 200 in the embodiments is supplied by display means like the display and input means like a key board provided to the information processing terminal.

Each f processing described above is only an exemplification, and the present disclosure may be applied to the execution of the combination processing of the above f processing or the execution of the other f processing. The flowchart shown in FIG. 5 can be changed properly within the range providing with the equivalent effect.

The present disclosure in the above embodiments is materialized as the digital multifunction periphery, however, the disclosure can be applied to not only the digital multifunction periphery but also any image processing device like the image forming device, such as the printer, the copying machine, and so on.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
an image data retaining unit for retaining image data having plural pages;
a preview unit for displaying an image displaying section on a display for displaying preview images of the image data retained in the image data retaining unit, together with an additional information listing section for displaying the additional information stored in the additional information retaining unit as pairs of the processing and the mark;
a position receiving unit for receiving a specific position of one page or plural pages that belong to a condition selected by a user, the specific position designated on the corresponding preview image displayed on the displayed screen by a user;
a selection receiving unit for receiving a user selection of the additional information displayed in the additional information listing section;
an additional information retaining unit for retaining additional information registered in advance, the additional information is a pair of at least one processing and an associated mark, the processing being one of printing, data storing, data transmission to another device, and access right imparting, the associated mark being different depending on the condition selected by the user;
an information imparting unit for imparting the additional information received by the selection receiving unit to the position received by the position receiving unit, and displaying the mark at the designated specific position on at least one of the preview images on the display screen; and
an image processing unit for extracting a page imparted with the additional information by the information imparting unit from the image data retained in the image data retaining unit, and executing the processing associated with the additional information.

2. The image forming apparatus according to claim 1, wherein the position receiving unit receives information of a direction of the mark on at least one of the preview images on the display screen.

3. The image forming apparatus according to claim 2, wherein a direction of the mark is changeable freely on the display section for a specific time.

4. The image forming apparatus according to claim 1, wherein the mark is displayed at a position on a page of the preview image displayed on the image displaying section.

5. The image forming apparatus according to claim 1, wherein the user designates the specific position to be imparted with the additional information after a message for asking the user to designate the specific position of the preview image, and then the user selects the additional information after a message for asking the user to select the additional information listed in the additional information listing section, and the preview unit displays the mark corresponding to the additional information on the designated position of the preview image.

* * * * *